United States Patent Office 2,762,683
Patented Sept. 11, 1956

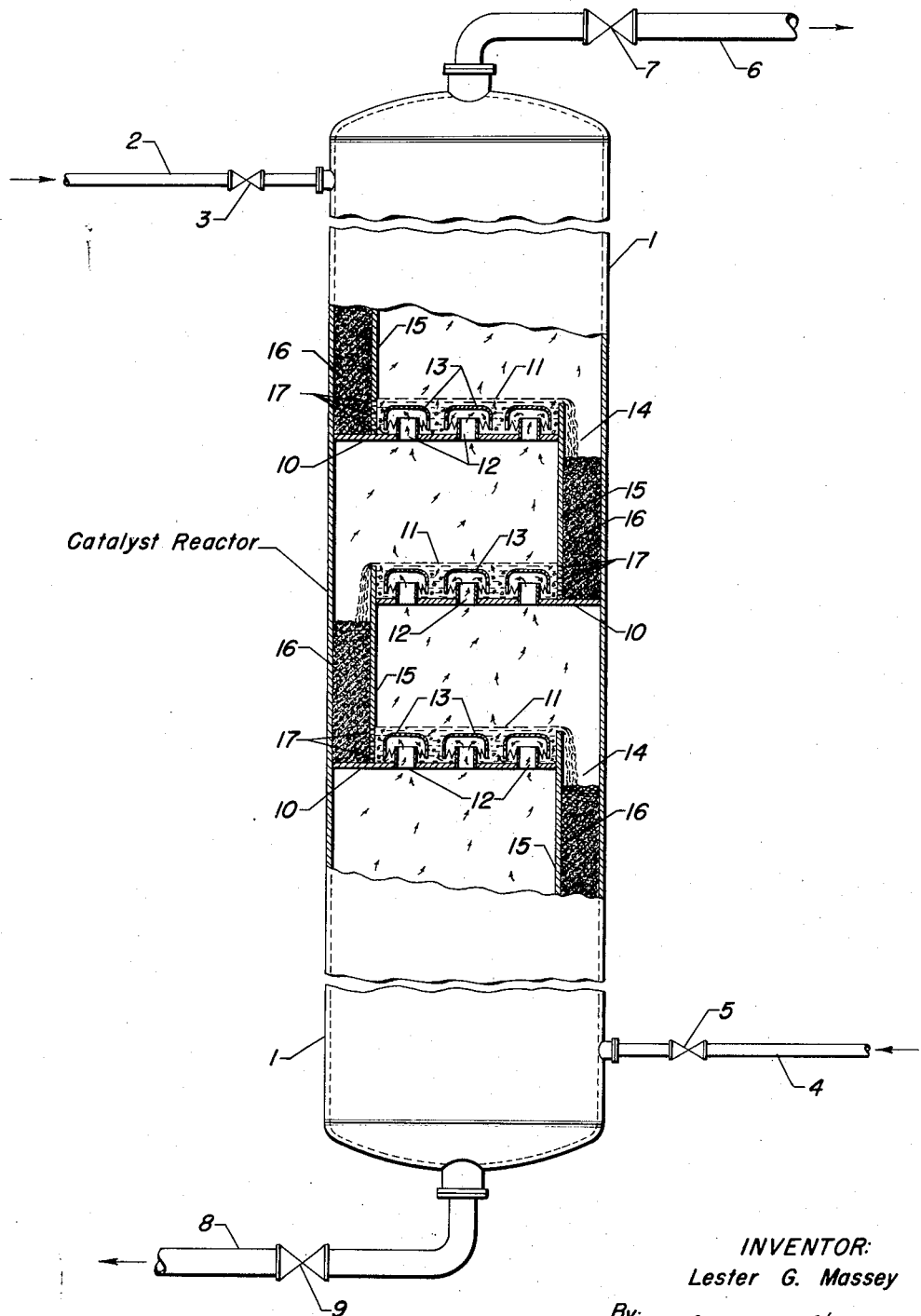

2,762,683

CONTACTING OF SOLID MATERIAL WITH LIQUID PHASE REACTANT STREAMS

Lester G. Massey, Chicago, Ill., assignor to Universal Oil Products Company, Des Plaines, Ill., a corporation of Delaware Application February 27, 1953, Serial No. 339,384

3 Claims. (Cl. 23—1)

This invention relates to an improved method and means for effecting the contacting of a solid contact material with a liquid phase reactant stream and more particularly to provide means for obtaining the multiple stage contacting of a liquid stream with a catalyst or other solid material and a gaseous medium.

There are various hydrocarbon conversion and treating operations, such as for example, hydrogenation and/or hydrodesulfurization, and nitrogen reduction and removal which may be effected while the reactant stream is in a liquid phase and in the presence of a gas such as hydrogen. There are also other operations, such as cracking and the like, where there is contact with a solid catalytic material and substantially simultaneous fractionation or stripping such that a gaseous stream is present in the reaction zone. There may also be various absorption and stripping processes where it is desirable to have substantially countercurrent flow and contact between liquid and gaseous mediums in the presence of a suitable contact material. The usual contact of a catalyst with a liquid phase reactant stream is effected in the so-called "fixed bed" type of operation, with the liquid reactant stream passing downwardly or upwardly through a relatively large stationery bed of catalyst particles in a confined zone. However, in this type of operation there may be difficulties with excessive pressure drops so that it is desirable to divide the entire mass of contact material into smaller contact beds. In the use of large masses of solid material there is also generally some channelling of the gaseous or liquid stream and inefficient contact with the entire mass of solid material as well as inefficient contacting between the gaseous and liquid streams.

It is a principal object of the present invention to provide novel means for effecting contact between a liquid reactant stream and a solid contact material as well as with a gaseous or vapor stream.

It is also an object of the invention to provide for multiple stage contacting of a liquid reactant stream in such a manner that the latter alternately contacts a solid material and a gaseous stream.

It is a still further feature of the invention to provide a compact, relatively simple form of apparatus suitable for maintaining a plurality of separate contact zones permitting the liquid reactant stream to alternately contact catalyst and a gaseous medium.

In a broad aspect, the present invention provides a method for effecting the separate multiple stage contacting of a liquid reactant stream with a solid contact material and a gaseous medium, in a manner which comprises, maintaining a plurality of separate vertically superimposed liquid-gas contacting zones within a confined reaction zone, passing the liquid reactant stream successively from one superimposed zone to another while simultaneously effecting the passage of the liquid medium in separate confined flow paths between contacting zones and contacting solid contact material within each of the confined flow paths, passing a gaseous stream upwardly through the reaction zone and into contact with the liquid stream within each of the superimposed contacting zones whereby the liquid stream alternately contacts solid material and the gaseous medium, and resulting contacted liquid and gaseous streams are discharged from respectively the lower and upper portions of the reaction zone.

In a simplified arrangement of the contacting apparatus, a plurality of perforate decks or substantially conventional types of bubble trays may be vertically spaced within the confined chamber and downspout means utilized between the superimposed zones formed by the spaced trays. Catalyst or other suitable contact material is retained within the downspout zones such that the catalytic contact is effected only with the liquid phase as it flows in a confined path through the downspout means. The gaseous medium which is introduced into the reaction zone bubbles upwardly through the perforate decks or through the risers and caps, etc., whereby all of the gas-liquid contacting is effected above each of the trays and within each of the superimposed contacting zones. By carrying out this type of operation there is effected primarily alternate contact between the liquid stream and the solid material and the liquid stream and the gaseous medium. However, in some types of conversion or treating operations the gaseous medium may be dissolved to some extent within the liquid stream such that the resulting liquid phase contacts the solid material within the downspout zones. In some types of reactions, the liquid stream may carry entrained or dissolved vapors such that as the stream percolates downwardly through the contact material within the downspout zones, the dissolved and entrained gaseous medium reacts with the liquid medium, catalytically or otherwise, to form either liquid or volatile reaction products, or both. The arrangement of the present invention may be also used for catalytic treatment of nitrogen compounds, as for example the reduction of solid nitro compounds to amines and the catalytic alkylation of dissolved solid amine compounds. Still further, when the liquid stream flows from a catalyst bed across the next lower tray there is contact with the rising gaseous stream so that there may be stripping of volatile reaction products and the resaturation of reacting gas with the liquid medium. The improved contacting arrangement thus permits a plurality of functions, including distillation, stripping and gas absorption, as well as catalytic reactions.

The improved contacting operation provided by the present invention may be better described and set forth by reference to the accompanying drawing and the following description thereof:

Column 1 is provided with an upper liquid inlet line 2 having control valve 3, a lower gas inlet line 4 having control valve 5, an upper gas or vapor outlet line 6 having control valve 7, and a lower liquid outlet line 8 having control valve 9. Within the interior portion of column 1 there is a plurality of spaced decks or trays 10 which provide superimposed liquid gas contacting zones 11. The present drawing indicates that the decks or trays 10 are of the bubble cap type, each having a plurality of vapor riser openings 12 which in turn each have a cap 13.

Between each of the superimposed liquid-vapor contacting zones and extending between each of the deck members 10 is a suitable liquid downspout zone 14. The downspout zones 14 are indicated diagrammatically as being formed in this case by vertical plates 15 and the inside wall of the chamber 1. In each case the plates 15 extend from a spaced distance above a deck member 10 to the top of a next lower member, and are adapted to retain a solid contact material 16. The latter may be in a pill or pellet form of a uniform or varying size, and as hereinbefore set forth, may comprise a catalyst suitable for effecting a desired conversion of the reactant stream. The lower portion of the plate members 15 is provided with suitable perforations 17 such that the solid contact material 16 is retained within the downspout zone while the liquid medium may flow therefrom to the surface of the deck or tray member 10 and subsequently flow laterally thereacross. As the liquid stream passes across each deck it flows over and around the risers and bubble caps so that the gaseous medium rising through the latter effects a contact therewith. The liquid stream subsequently passes to the inlet edge or weir portion of the next lower plate 15 and downspout zone 14. The extension of plate members 15 above the deck members 10 provides in each case an overflow weir that controls liquid level over any given tray whereby to in turn effect a regulation of the pressure drop for the gaseous medium rising through the various bubble caps and liquid medium.

In a contacting operation, the liquid reactant stream enters the upper portion of the column 1, by way of line 2, and flows successively downwardly through the plurality of contact beds of material 16 within the confined downspout zones 14, while at the same time passing above each deck member 10 in a substantially lateral flow which is subjected to the substantially uniform upward cross-current flow of a gaseous medium that is introduced into the lower portion of column 1 by way of line 4. The liquid stream thus alternately contact a solid material and a gaseous medium as it passes in a continuous recrossing and descending flow through the confined column 1.

By way of a specific example of the present improved contacting operation, it may be assumed that a liquid hydrocarbon stream undergoing catalytic conversion may contain relatively high amounts of sulfur and/or may comprise cracked material containing unsaturated olefins so that the stream is preferably hydrogenated before undergoing further treating, such as reforming and the like. Specifically, a cracked sulfur containing hydrocarbon stream boiling in the gasoline range may be introduced through line 2 and valve 3 into the upper portion of column 1 at a temperature of the order of about 200° to 500° F. At the same time, hydrogen may be introduced into the lower end of the column by way of line 4 in a quantity providing a hydrogen-to-hydrocarbon ratio which may vary from 1 to about 20, on a molal basis, and preferably above 1.

Hydrogenation is normally favored by high pressure operations, and it is desirable in the present liquid phase type of operation to maintain the hydrocarbon stream at a high superatmospheric pressure while limited only by the consideration of maintaining the hydrocarbon stream sufficiently below the critical point so that vapor-liquid phase separation can be readily accomplished. The operating pressure should be above about 10 p. s. i. g. and normally in the range of between 200 and 1,000 p. s. i. g., although still higher pressures may in certain particular cases be utilized. The temperature gradient in the column, existing by virtue of the distillation separation involved, is of course affected by the exothermic hydrogenation, and this depends upon the degree of unsaturation of the charge stream together with the extent and rate of conversion. The temperature rise may also govern the inlet temperature of the charge stream in any given operation. A pelleted or other subdivided form of a suitable hydrogenation catalyst, such as for example, nickel, or nickel and copper on a supporting base is maintained within the beds 16 and downspout zones 14 throughout at least a portion of the interior of column 1. Thus, the hydrocarbon stream alternately contacts catalyst within the confined downspout zones 14 and hydrogen within the lateral flowing portions 11 of the liquid stream, above each of the contact decks 10. The resulting contacted and hydrogenated stream is withdrawn from the lower end of column 1 by way of line 8 and valve 9 while contacted hydrogen, together with hydrogen sulfide, water and perhaps minor amounts of methane and light normally gaseous hydrocarbons may be discharged from the upper end of the column by way of line 6 and valve 7. The hydrogen stream may be subjected to purification, particularly removal of the hydrogen sulfide by alkaline reagents in suitable apparatus, and then subsequently preheated and recycled to the lower end of column 1.

It is not intended to limit any particular contacting column to the use of bubble trays and downspout zones and to catalytic conversions only, for in modifications of the apparatus arrangement, various types of perforate trays or bubble decks may be utilized in the upper portion of the column to effect fractionation and/or stripping. Likewise, conventional types of contact trays or decks may be utilized in the lower portion of the column for strictly liquid-gas contacting in a stripping operation. Further, a reboiler may be utilized in the lower end of the column for maintaining a desired reaction temperature and distillation separation therein.

I claim as my invention:

1. A method of contacting a liquid reactant stream with a solid catalytic material and a gaseous medium which comprises passing the liquid stream laterally across a first liquid-gas contacting zone within a confined reaction zone, then passing the liquid stream downwardly from said contacting zone through a stationary bed of subdivided catalyst of relatively small cross-sectional area, discharging the downwardly flowing liquid stream from the catalyst bed into a second liquid-gas contacting zone disposed within the reaction zone below said first contacting zone, passing the liquid stream laterally across said second contacting zone in a horizontal direction opposite to the direction of flow of the liquid stream across said first contacting zone, passing said gaseous medium upwardly through the reaction zone and through the liquid reactant flowing laterally across said contacting zones, again contacting the liquid stream with catalytic material by passing the same downwardly from said second contacting zone through another stationary bed of subdivided solid catalyst of relatively small cross-sectional area, discharging the contacted liquid stream from the lower portion of the reaction zone and discharging the contacted gaseous medium from the upper portion of the reaction zone.

2. A method for effecting the separate multiple stage contacting of a liquid reactant stream with a solid catalytic material and a gaseous medium which comprises, maintaining a plurality of separate vertically superimposed liquid-gas contacting zones within a confined reaction zone, introducing said liquid reactant stream to the upper portion of the latter and passing it successively from one contacting zone to a next lower contacting zone while simultaneously introducing a gaseous reactant medium into the lower portion of said confined reaction zone and passing it upwardly through the latter and successively through the superimposed contacting zones, passing the liquid reactant stream downwardly from one contacting zone to another through a stationary bed of subdivided solid catalyst of relatively small cross-sectional area, the catalyst beds being disposed in a staggered relationship between adjacent contacting zones throughout the height of the confined reaction zone whereby the liquid reactant stream flows substantially laterally through each contacting zone and is maintained in a recrossing flow throughout the height of the confined reaction zone, and discharging resulting contacted liquid and gaseous streams from respectively the lower and upper portions of said reaction zone.

3. The process of claim 2 further characterized in that said beds between adjacent contacting zones comprise pellets of catalyst providing the catalytic conversion of said liquid reactant stream within said confined reaction zone.

References Cited in the file of this patent

UNITED STATES PATENTS

| | | |
|---|---|---|
| 1,782,735 | MacKenzie | Nov. 25, 1930 |
| 2,639,973 | Fritz | May 26, 1953 |